(12) United States Patent
Krause

(10) Patent No.: US 8,146,717 B1
(45) Date of Patent: Apr. 3, 2012

(54) BRAKE ARRANGEMENT FOR A MOBILE STORAGE SYSTEM

(75) Inventor: Sean R. Krause, Fort Atkinson, WI (US)

(73) Assignee: Spacesaver Corporation, Fort Atkinson, WI (US)

( * ) Notice: Subject to any disclaimer, the term of this patent is extended or adjusted under 35 U.S.C. 154(b) by 565 days.

(21) Appl. No.: 12/396,195

(22) Filed: Mar. 2, 2009

(51) Int. Cl.
*F16D 51/00* (2006.01)
(52) U.S. Cl. .................................................. 188/77 W
(58) Field of Classification Search ............... 188/77 R, 188/77 W, 249, 82.6, 259
See application file for complete search history.

(56) References Cited

U.S. PATENT DOCUMENTS

| | | | |
|---|---|---|---|
| 1,353,370 A | 9/1920 | Williams | |
| 4,211,309 A | 7/1980 | Ruggiero | |
| 4,456,100 A * | 6/1984 | Manaki | 188/77 R |
| 4,558,861 A | 12/1985 | Gall | |
| 4,560,137 A | 12/1985 | Svoboda | |
| 4,616,889 A | 10/1986 | Peterman | |
| 4,891,959 A * | 1/1990 | Wood | 188/77 R |
| 5,445,246 A * | 8/1995 | Haka et al. | 188/77 R |
| 5,984,054 A * | 11/1999 | Martinsson | 188/77 R |
| 7,200,941 B2 * | 4/2007 | Myers | 188/77 R |

* cited by examiner

*Primary Examiner* — Melanie Torres Williams
(74) *Attorney, Agent, or Firm* — Andrus, Sceales, Starke & Sawall, LLP

(57) ABSTRACT

A brake arrangement is provided for a mobile storage unit having a drive arrangement for causing movement of the mobile storage unit. The brake arrangement has a brake member mounted to and rotatable with a drive shaft of the drive arrangement, and acts on the drive shaft when the input force on the drive shaft is relieved. A flexible band is engaged with the brake member and defines a pair of ends that are engaged with a tensioning mechanism. The tensioning mechanism applies a tensioning force to the ends of the brake band to tension the brake band against the brake member to inhibit rotation of the drive shaft and thus movement of the mobile storage unit when the input force is relieved.

11 Claims, 3 Drawing Sheets

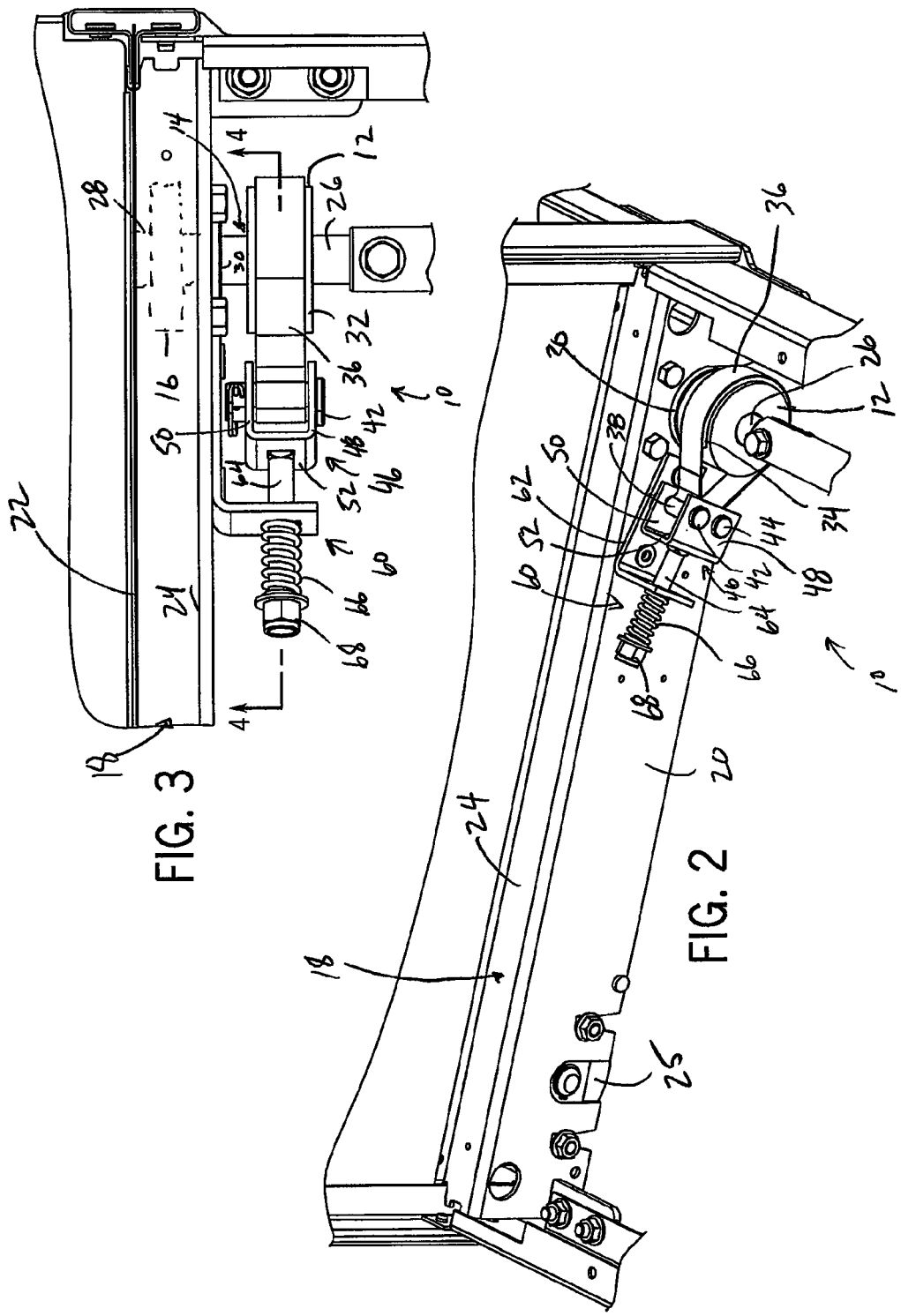

BRAKE ARRANGEMENT FOR A MOBILE STORAGE SYSTEM

BACKGROUND AND SUMMARY OF THE INVENTION

The present invention is directed to mobile storage systems and, more particularly, to a brake or anti-drift arrangement for a mobile storage unit.

Mobile storage systems have long been utilized to store documents, books and other items in a high density manner that also allows for easy access to the items contained on any portion of the mobile storage system. These systems typically include a number of storage units movably mounted on rails that are secured to the floor of a room or other enclosure. By operation of a motive system associated with each of the storage units, individual units may be moved along the rails to expose a desired unit in order to retrieve the items contained therein.

The motive system for these types of storage units can be either a mechanical system or an electrical powered system. With a mechanical motive system, each storage unit is moved by manually activating the mechanical mechanism, such as a hand crank. The crank or other manual activation means is disposed directly on an endmost one of the storage units, and is mechanically connected, such as by a drive shaft, to wheels on the storage unit to move those wheels and the storage unit along the rails.

With regard to a powered electrical motive systems used for the storage units, the system is activated by utilizing a switch that is operably connected to an electrically-powered motor connected to a drive shaft that rotates wheels of the storage unit. The activation of the motor then causes the wheels of the storage unit to rotate in the selected direction to move the storage unit in the desired direction. When operation of the motor is stopped, a brake associated with the motor prevents further rotation of the drive shaft, so that movement of the storage unit automatically stops when power to the motor is cut off, and the brake of the motor functions to prevent the storage unit from drifting out of position once movement of the storage unit is stopped.

In a mobile storage system that utilizes a mechanical drive system, the motive power is manually supplied by a user. As such, systems of this type do not have a motor so that the braking function provided by the motor is not available when it is desired to stop movement of the storage unit. Because of this, the momentum of the storage unit can cause the storage unit not to stop immediately when the user stops the application of input power by operation of the input device, such as the hand crank. In addition, in systems such as this, it is possible for the storage of units to drift or roll away from a desired position when the motive power applied to the storage and is relieved. Such movement of the storage unit can be caused by uneven or unlevel floor or rail conditions, or by deflection of the floor and/or rails.

A number of braking or anti-drift systems have been developed to stop rotation of the wheels of a storage unit when the input force is removed, or to prevent unwanted movement of storage units when the storage units are stationary. Systems have been developed that stop rotation of the wheel directly through engagement of a braking member with the wheel itself or indirectly by engagement of a braking member with the axle of the wheel. While generally satisfactory in stopping further movement of the storage unit after the input force has been removed or preventing movement of stationary storage units, the amount of braking force is generally fixed. This can be problematic as the load on a storage unit may not be well matched to the fixed braking force that is applied by the braking system. If the braking force is too great, it may difficult for the input force to overcome the inertia of a heavily loaded storage unit as well as the braking force of the braking system to move the storage unit. If the braking force is too weak, it may not be sufficient to quickly stop translation of the heavily loaded storage unit when the input force is removed. Too much braking force can also be a problem for lightly loaded storage units. While initial translation of the storage unit may not be difficult, when the input force is removed, if the braking force is too great, the storage unit could effectively be jolted by the application of the braking force, causing objects stored on the storage unit to jostle or fall.

As a result, it is desirable to develop a braking or anti-drift device for manually operated storage units used in a mobile storage system that, while capable of providing the desired braking feature to the individual units within the storage system in order to prevent movement of stationary storage units or to brake storage units during movement, does not require electrical power and also has a relatively simple construction for easy incorporation with the storage units. Moreover, it is desirable to have a braking device that does not require activation by a user to be effective. There is also a desire have a braking device in which the amount of braking force that is applied can be adjusted as needed to tailor the braking device to the load of the mobile storage unit and to other conditions.

In accordance with the present invention, an anti-drift or braking device for a mobile storage unit includes a dual-ended and flexible band that forces a brake pad into contact with a brake member that rotates with the drive shaft or axle of a wheel of the mobile storage unit. Each end of the band is connected to a tensioning mechanism that applies a tensioning force to the ends of the band to tension the flexible band. The tensioning mechanism may include a tensioning actuator that allows for varying the tensioning force applied to the ends of the band to adjust the tension that the flexible band applies to the brake pad. The flexible band applies tension against the brake member regardless of the rotational direction of the brake member.

Therefore, in accordance with one aspect of the invention, a mobile storage system includes one or more mobile storage units and a drive arrangement interconnected with the one or more storage units for causing movement of the one or more storage units. The drive arrangement includes a rotatable drive shaft that rotates in response to application of an input force. The system also includes a brake arrangement that acts on the drive shaft when the input force on the drive shaft is relieved, in order to prevent stationary storage units from drifting and/or to assist in stopping the storage units. The brake arrangement includes a brake member mounted to and rotatable with the drive shaft. A flexible band is engaged with the brake member and defines a pair of ends that are engaged with a tensioning mechanism. The tensioning mechanism applies a tensioning force to the ends of the brake band to tension the brake band against the brake member.

The invention also contemplates a method of preventing or braking movement of a mobile storage system having one or more mobile storage units and a drive arrangement interconnected with the one or more storage units for causing movement of the one or more storage units is provided. The method includes imparting a rotational movement to a brake member in response to rotation of a drive shaft of the drive arrangement and then applying a braking force to the brake member by applying tension to a pair of ends defined by a flexible brake band that is engaged about the brake member. The braking force is operable to stop rotation of the drive shaft when an input force to the drive shaft is relieved, and to prevent drifting movement of stationary storage units.

In accordance with yet another aspect of the invention, a mobile storage support system includes a mobile support arrangement that supports one or more storage units, and the mobile support arrangement includes a rotatable drive shaft that rotates in response to the application of an input force. The support system further includes a brake arrangement that acts on the drive shaft when the input force on the drive shaft is relieved. The brake arrangement has a brake member that rotates in response to rotation of the drive shaft. A flexible brake band is engaged with the brake member and defines a pair of ends. A tensioning mechanism is engaged with the ends of the brake band and applies a tensioning force to the ends of the brake band to tension the brake band against the brake member.

The present invention offers a number of advantages over prior braking or anti-drift systems for mobile storage units. For example, the present invention provides uniform application of braking force on the brake member, as well as adjustability of the tension applied on the brake member. In this regard, the invention allows the tension be adjusted to accommodate the load on a storage unit. The invention also allows the tension to be adjusted as the elasticity of the flexible band varies over time or as a brake pad wears.

The present invention is relatively compact, less complex, and easy to install when compared to prior braking systems. In this regard, the invention can be used with a low profile carriage of a mobile storage unit. Furthermore, the invention can be used with carriageless mobile storage units. As will be appreciated in the description that follows, a relative small diameter brake member and a taut flexible band together with a brake pad can be used to brake a mobile storage unit.

It is therefore an object of the invention to provide a brake arrangement or anti-drift arrangement for use with a mobile storage unit that provides a uniform application of a braking force and also allows for adjustment of the braking force applied by the brake arrangement.

It is another object of the invention to provide a brake or anti-drift arrangement that requires an input force to overcome the braking force applied by the brake arrangement but does not require a user to disengage the brake arrangement. It is yet a further object of the invention to provide a brake arrangement that automatically applies a braking force when an input force is relieved rather than requiring a user to engage the brake arrangement.

It is another object of the invention to provide a brake arrangement that may be used with carriageless mobile storage units.

It is another object of the invention to provide a brake arrangement that may be used with mobile storage units that are moved by a mechanical motive system, but which also can be utilized with an electrical motive system.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 2 is an isometric view of the braking arrangement according to the present invention as incorporated into the mobile storage system of FIG. 1;

FIG. 3 is a top plan view of the braking arrangement shown in FIG. 2; and

DETAILED DESCRIPTION OF THE INVENTION

The present invention is generally directed to a braking system for use with a mobile storage unit, and is particularly well-suited for use with a carriageless mobile storage unit, such as that described in copending application Ser. No. 12/396,829 filed Mar. 3, 2009, the entire disclosure of which is incorporated herein. Additionally, while the invention will be described for use with a mobile storage unit that is moved by the application of a mechanical motive force, it is understood that the invention may be used with mobile storage units that are moved by the application of an electrical motive force.

Figure 1:
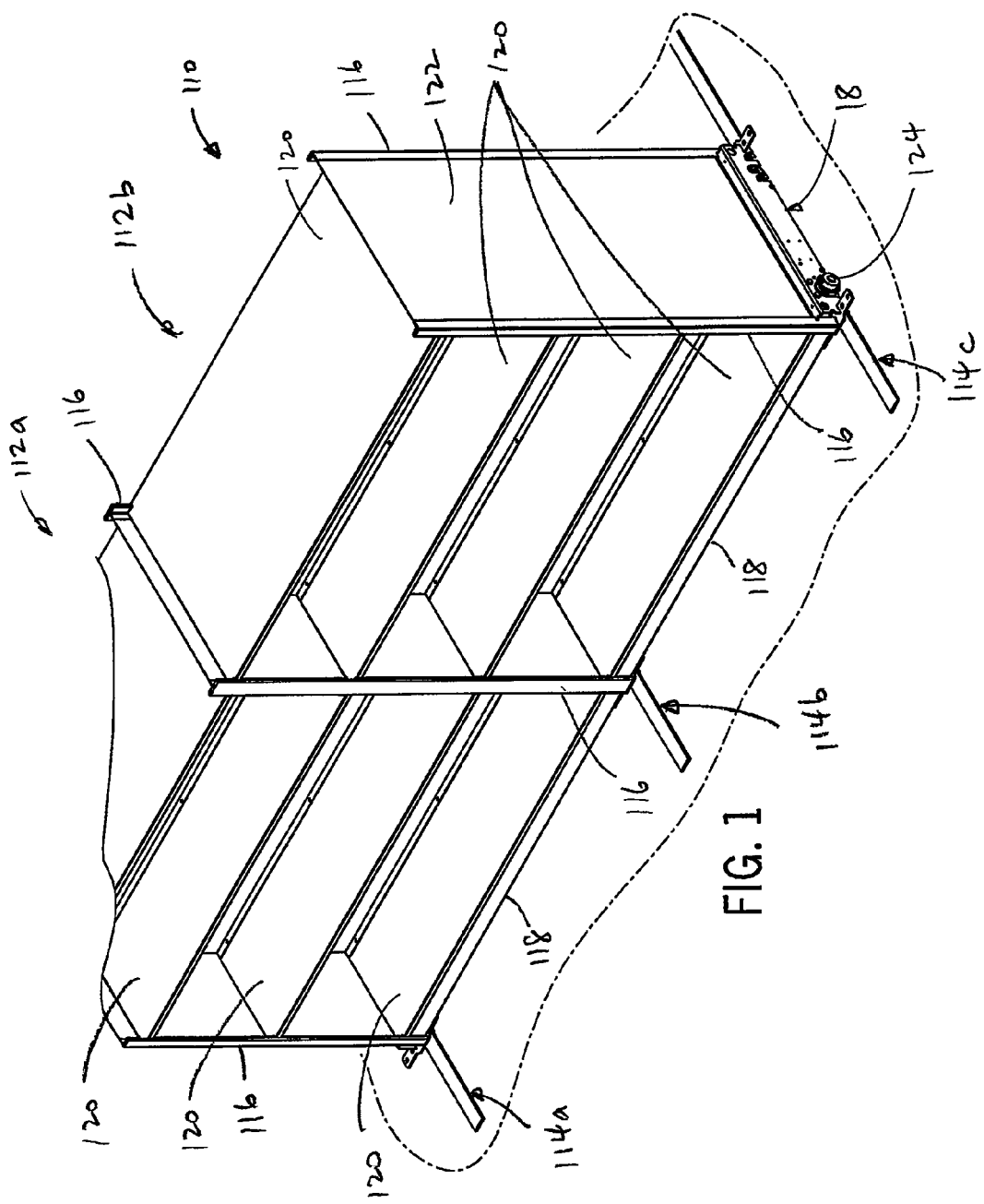
FIG. 1 is a partial isometric view of a mobile storage system, shown as having two mobile storage units, which is movable by a drive arrangement and which includes a braking arrangement according to the present invention.

Referring to FIG. 1, a mobile storage system 110 generally includes a series of storage units, such as shown at 112a, 112b, which are connected together and are movable on a series of rails, such as shown at 114a, 114b and 114c. Generally, the storage units 112a and 112b are made up of a series of upright support members 116, the end ones of which are generally L-shaped and the intermediate ones of which are generally T-shaped. A series of shelf support members 118 extend between and interconnect the upright support members 116, and are operable to support a series of shelves 120. It is understood that, while FIG. 1 illustrates two storage units, storage system 110 may be made up of any number of storage units.

Storage units 112a and 112b are movable on rails 114a-114c by operation of a drive system that is generally constructed in a manner as known in the art. The drive system includes a manually operated crank that is secured to one of the end panels of the storage system 110, such as shown at 122. The handcrank enables an operator to provide a rotational input force when it is desired to move the storage units 112a and 112b in one direction or the other. The handcrank functions to drive a chain through a suitable gear drive system, and the chain is trained about an input member, in the form of a sprocket 124. The sprocket 124 provides input power to a drive shaft (not shown in FIG. 1), which is operable to move the storage units 112a and 112b on the rails 114a-114c. The drive shaft, in turn, is rotatably secured to, and extends between, a series of wheel units, such as shown at 18. In a mariner as shown and described in the aforementioned copending application Ser. No. 12/396,829, the upright support members 116 and the shelf support members 118 are interconnected together along with wheel units 18 to form the storage units 112a and 112b. This arrangement allows storage system 10 to be constructed in a manner without the use of carriages to which the storage units are mounted, which provides a simplified system that is relatively low in cost and can be shipped to an installation site in a knock-down manner. It is understood, however, that the braking system in accordance with the present invention may be used in any type of storage system that utilizes a drive shaft, and is not limited to the specific construction of the storage system as shown and described herein.

Referring now to FIGS. 2-3, a braking arrangement 10 according to one embodiment of the invention is incorporated into the storage system 110. The braking arrangement 10 is preferably interconnected with one of the wheel units 18, and has a brake member 12 that is mounted to and rotatable with a drive shaft 14. In a manner as is known, sprocket 124 is secured to the end of the drive shaft 14, and drive shaft 14 is operable to drive the wheels of wheel units 18, such as shown at 16, in order to move storage units 112a, 112b in response to operation of the handcrank by the user. The wheel 16 is enclosed within a wheel unit 18 that is generally comprised of a pair of spaced apart side walls 20, 22 and an upper wall 24 connected to the side walls 20, 22. The wheel unit 18 also provides an enclosure for a wheel 25 that is spaced longitudinally from wheel 16 and is secured to the wheel unit 18 in a conventional manner.

The drive shaft 14 has a first end 26 and a second end 28 that extend in opposite directions from wheel 16. The first end 26 extends through a first mounting member 30 and the second end extends through a second mounting member (not shown). The first mounting member 30 is attached to the side wall 20 whereas the second mounting member is attached to the side wall 22. In this regard, the mounting members 30 are adapted to mount the drive shaft 14 to the wheel unit 18.

Figure 4:
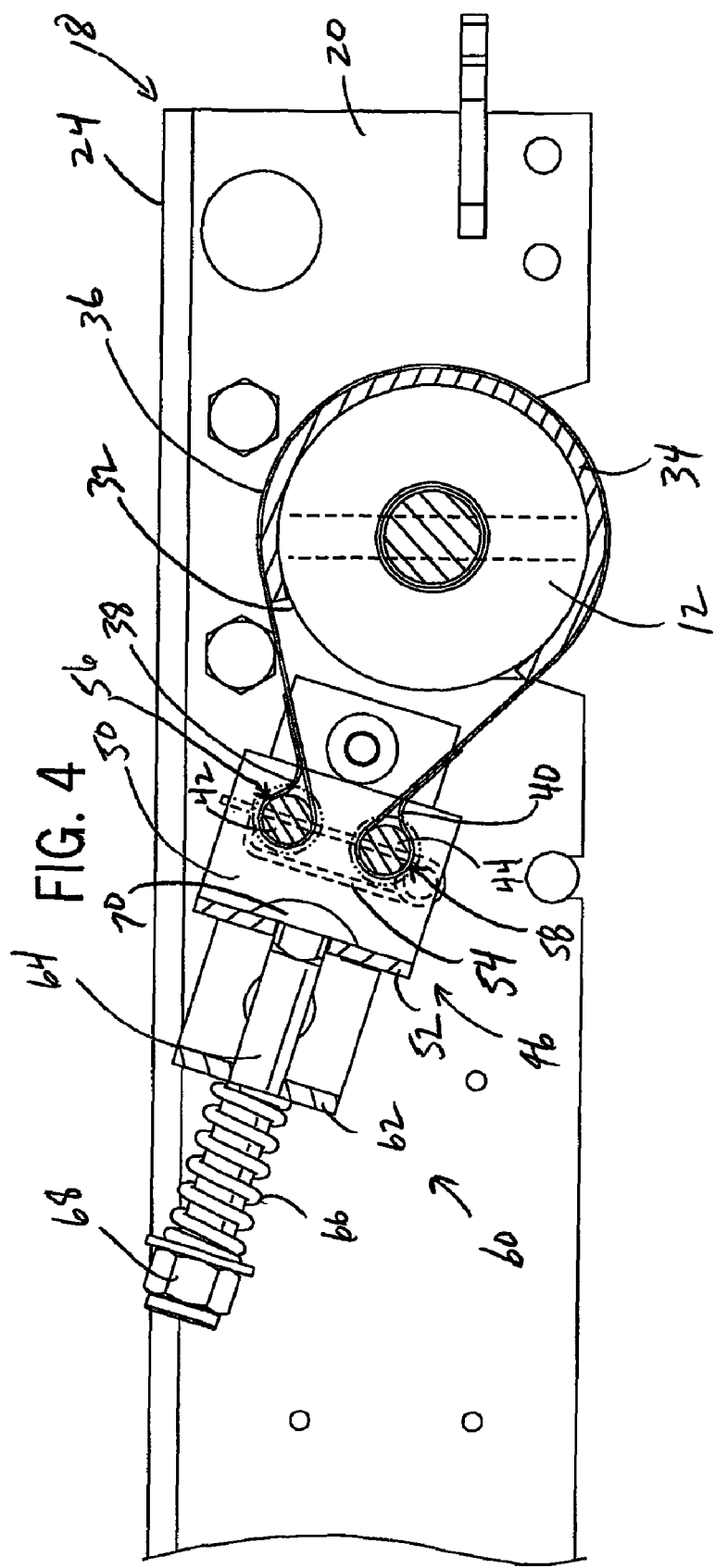
FIG. 4 is a section view of the braking arrangement taken along line 4-4 of FIG. 3.

The brake member 12, which in the illustrated embodiment takes the form of a brake drum, is carried by the first end 26 of the drive shaft 14 and is positioned generally adjacent to but spaced from the first mounting member 30. The brake member 12 rotates with the drive shaft 14, and has a peripheral outer surface 32. A brake pad 34 formed of high friction material is held against the peripheral outer surface 32 by a flexible band 36. In one embodiment, the brake pad 34 is separate from the flexible band 36; however, it is understood that the flexible band 36 itself may be formed of a high friction material. With additional reference to FIG. 4, the band 36 has a pair of ends 38, 40 that are connected to respective pins or posts 42, 44 carried by a saddle 46. The saddle 46 has a pair of opposed sidewalls 48, 50 interconnected by a generally upright wall 52. Pairs of aligned openings (not numbered) are formed in the side walls 48, 50 that allow the posts 42, 44 to be removed from the saddle 46, when desired, such as to replace or service the flexible band 36 or the brake pad 34. Eyelets (not numbered) are formed in ends of the posts 42, 44, and a cotter or similar pin 54 may be passed through the eyelets to retain the posts 42, 44 with the saddle 46.

It will be appreciated that the removability of the posts 42, 44 allows for relatively easy access to the flexible band 36 and the brake pad 34 when either of those components need to be replaced. More particularly, the cotter pin 54 can be removed and the posts 42, 44 pulled away from the saddle 46. This causes the ends 38, 40 of the flexible band 36 to be released and to fall from the saddle 46. With the posts 42, 44 removed, there is no tension on the flexible band 36, which allows the band 36 to be pulled away from the brake member 12, which also removes any holding force applied by the band 36 on the brake pad 34. In one preferred embodiment, loops 56 and 58 are formed in ends 38 and 40, respectively. These loops 56, 58 effectively form openings through which posts 42, 44 may be inserted when the flexible band 36 is being installed.

The flexible brake band 36 and the tensioning mechanism are designed such that the band 36 is wrapped about a majority of the circumference of the brake member 12. Representatively, the band 36 is configured to engage the outer peripheral surface of the brake member 12 throughout an included angle of approximately 210 degrees, although it is understood that a greater or lesser amount of contact between the band 36 and the brake member 12 may be provided.

As noted above, the flexible band 36 is designed to push the brake pad 34 against the outer peripheral surface of the brake member 12. To do so, the flexible band 36 must be tensioned. In this regard, the present invention also provides a tensioning mechanism 60 that includes a bracket 62 that is attached to the wheel unit 18, and has an aperture (not numbered) through which a pin 64 extends. The pin 64 is biased away from the brake member 12 by a spring 66 that is positioned around the pin 64 between the bracket 62 and a nut 68 secured to the pin 64 opposite the brake member 12. The spring 66 provides a relatively constant force on the pin 64 to urge the pin 64 through the aperture in the bracket 62 away from the brake member 12. The position of the nut 68 can be adjusted to vary the compressive force of the spring 66.

Opposite the spring 66, the pin 64 includes a pinhead 70 that is seated against the back side (brake roller side) of the upright wall 52 of the saddle 46. Due to the constant bias on the pin 64 from the spring 66, the spring 66 effectively pulls the pin 64 away from the brake member 12, which causes the pinhead 70 to urge the saddle 46 away from the brake member 12. The posts 42, 44, which are securely carried by the saddle 46, are thus also urged away from the brake member 12. Since the ends 38, 40 of the flexible band 36 are retained within the saddle 46 by posts 42, 44, as the saddle 46 is urged away from the brake member 12, the tension is applied to both ends of the flexible band 36 which urges the brake pad 34 into contact with the brake member 12 thereby providing a braking force against rotation of the brake member 12 and therefore rotation of the drive shaft 14 and the wheel 16. It should be appreciated that the saddle 46 and the pin 64 are movably secured to the bracket 62 for axial movement relative to the brake member 12 along a line which intersects a longitudinal axis of the drive shaft 14. With this construction, the tension applied to both ends of the flexible band 36 along with the significant amount of contact area provided between the flexible band 36 and the brake member 12, provides a secure and uniform braking force that efficiently and effectively retards rotation of drive shaft 14 when the input force tending to rotate drive shaft 14 is removed.

The tension in the flexible band 36 is preferably set such that the input force to the drive shaft 14 is sufficient to overcome the resistance against rotation provided by the brake pad 34 on the brake member 12 to allow the storage unit to be moved. However, once the input force has been removed, the friction between the brake pad 34 and the brake member 12 caused by the bias of the spring 66 provides a sufficient retarding force to prevent further rotation of the drive shaft 14 and thus wheel 16, and also functions to ensure that a stationary storage unit does not move or drift out of position after the input force on drive shaft 14 has been relieved.

As noted above, the tension provided by the tensioning mechanism 60 can be adjusted. This feature of the tensioning mechanism provides a number of advantages. For example, as the brake pad 34 wears over time, more tension may be needed to provide the desired braking. Further, the load on a storage unit affects the momentum that builds in the storage unit as the storage unit is being translated. When the input force is removed, this momentum can cause further movement of the storage unit absent sufficient braking. The adjustment provided by the tensioning mechanism described herein allows the braking force to be strengthened for heavily loaded storage units where more braking force is needed to counter the momentum that may build in the storage unit. On the other hand, for a lightly loaded storage unit, less braking force may be desired to prevent undesirable forces experienced by of the contents of the storage unit if the mobile storage unit is stopped too abruptly.

Various alternatives and embodiments are contemplated as being within the scope of the following claims particularly pointing out and distinctly claiming the subject matter regarded as the invention.

I claim:

1. A mobile storage system, comprising:
one or more mobile storage units;
a drive arrangement interconnected with the one or more storage units for causing movement of the one or more storage units, wherein the drive arrangement includes a rotatable drive shaft that rotates in response to application of an input force; and
a brake arrangement that acts on the drive shaft when the input force on the drive shaft is relieved, wherein the brake arrangement comprises a brake member mounted to and rotatable with the drive shaft; a flexible brake band engaged with the brake member, wherein the flexible brake band defines a pair of ends; and a tensioning mechanism engaged with the ends of the brake band, wherein the tensioning mechanism is configured to apply a tensioning force to the ends of the brake band to tension the brake band against the brake member,
wherein the tensioning mechanism comprises a stationary mounting member interconnected with one of the mobile storage units, and a tensioning actuator movably interconnected with the mounting member, wherein the tensioning actuator is secured to the ends of the brake band and acts on the ends of the brake band to tension the brake band about the brake member, and
wherein the tensioning actuator is movably secured to the mounting member for axial movement toward and away from the brake member along a line intersecting a longitudinal axis of the drive shaft, and further comprising a biasing arrangement interposed between the mounting member and the tensioning actuator for providing a force constantly biasing the tensioning actuator away from the brake member and thereby applying a tensioning force on the ends of the brake band.

2. The mobile storage system of claim 1, wherein the brake member defines a peripheral outer surface with which the brake band is engaged.

3. The mobile storage system of claim 2, wherein the peripheral outer surface of the brake member is circular.

4. The mobile storage system of claim 1, further comprising a tension adjustment arrangement associated with the tensioning actuator for adjusting the biasing force applied to the tensioning actuator by the biasing arrangement.

5. The mobile storage system of claim 1, wherein the tensioning actuator defines a proximal end interconnected with the ends of the brake band and a distal end located outwardly of an engagement surface defined by the mounting member, and wherein the biasing arrangement includes a spring that acts on and encircles the distal end of the tensioning actuator to urge the tensioning actuator away from the brake member to tension the brake band about the brake member.

6. The mobile storage system of claim 5, further comprising an adjustment member engaged with and movable on the distal end of the tensioning actuator, wherein the adjustment member acts on the spring such that movement of the adjustment member functions to vary the force applied by the spring on the tensioning actuator and thereby the tensioning force applied by the tensioning actuator to the brake band.

7. A method of braking movement of a mobile storage system that includes one or more mobile storage units and a drive arrangement interconnected with the one or more storage units for causing movement of the one or more storage units, wherein the drive arrangement includes a rotatable drive shaft that rotates in response to application of an input force, comprising the acts of:
imparting rotational movement to a brake member in response to rotation of the drive shaft; and
applying a braking force to the brake member by applying tension to a pair of ends defined by a flexible brake band that is engaged about the brake member, wherein the braking force is operable to stop rotation of the drive shaft when the input force is relieved,
wherein the act of applying tension to the pair of ends defined by the flexible brake band is carried out via a tensioning actuator movably interconnected with a mourning member interconnected with one of the storage units along a line intersecting a longitudinal axis of the drive shaft, wherein the tensioning actuator is secured to the ends of the brake band and acts on the ends of the brake band to tension the brake band about the brake member, and further comprising the act of constantly biasing the tensioning actuator away from the brake member to apply a tensioning force on the ends of the brake band.

8. The method of claim 7, wherein the brake member defines a peripheral circular outer surface with which the brake band is engaged, and wherein the brake band is configured such that the act of applying tension to the pair of ends of the flexible brake band tensions the brake band about a majority of the peripheral circular outer surface defined by the brake member.

9. The method of claim 7, wherein the act of biasing the tensioning actuator away from the brake member is carried out by operation of a spring, and further comprising the act of adjusting the tensioning force applied to the ends of the brake band by the spring.

10. A mobile storage support system, comprising:
a mobile support arrangement configured to support one or more storage units, wherein the mobile support arrangement includes a rotatable drive shaft that rotates in response to application of an input force; and
a brake arrangement that acts on the drive shaft when the input force on the drive shaft is relieved, wherein the brake arrangement comprises a brake member that rotates in response to rotation of the drive shaft; a flexible brake band engaged with the brake member, wherein the flexible brake band defines a pair of ends; and a tensioning mechanism engaged with the ends of the brake band, wherein the tensioning mechanism is configured to apply a tensioning force to the ends of the brake band to tension the brake band against the brake member,
wherein the tensioning mechanism comprises a stationary mounting member interconnected with the mobile support arrangement, and a tensioning actuator movably interconnected with the mounting member, wherein the tensioning actuator is secured to the ends of the brake band and acts on the ends of the brake band to tension the brake band about the brake member, the tensioning actuator including a saddle coupled to a pin which extends through the mounting member and is constantly urged away from the brake member by a spring positioned around the pin and located between the mounting member and an adjustment nut movably secured to the pin opposite the brake member.

11. The mobile storage support system of claim 10, wherein the brake member defines a peripheral circular outer surface with which the brake band is engaged.

* * * * *

UNITED STATES PATENT AND TRADEMARK OFFICE
CERTIFICATE OF CORRECTION

| | | |
|---|---|---|
| PATENT NO. | : 8,146,717 B1 | |
| APPLICATION NO. | : 12/396195 | |
| DATED | : April 3, 2012 | |
| INVENTOR(S) | : Sean R. Krause | |

It is certified that error appears in the above-identified patent and that said Letters Patent is hereby corrected as shown below:

DETAILED DESCRIPTION OF THE INVENTION:
In column 4, line 50, delete "mariner" and substitute --manner--.

IN THE CLAIMS:
In claim 7, column 8, line 11, delete "mourning" and substitute --mounting--.

Signed and Sealed this
Fifteenth Day of May, 2012

David J. Kappos
*Director of the United States Patent and Trademark Office*